PATENTED FEB 4 1868

74035

*Ezra Babcock*

*Combined Harrow and Stone Remover*

Witnesses.
A. S. Yeatman
A. N. Marr

Ezra Babcock, Inventor.
by Alexander Mason, Atty.

United States Patent Office.

EZRA BABCOCK, OF SCOTT, NEW YORK.

Letters Patent No. 74,035, dated February 4, 1868.

---

IMPROVEMENT IN COMBINED HARROW AND STONE-REMOVER.

---

The Schedule referred to in these Letters Patent and making part of the same.

---

TO ALL WHOM IT MAY CONCERN:

Be it known that I, EZRA BABCOCK, of Scott, in the county of Cortland, and in the State of New York, have invented certain new and useful Improvements in Combined Harrow and Stone-Remover; and do hereby declare that the following is a full, clear, and exact description thereof, reference being had to the accompanying drawings, and to the letters of reference marked thereon.

Figure 1:
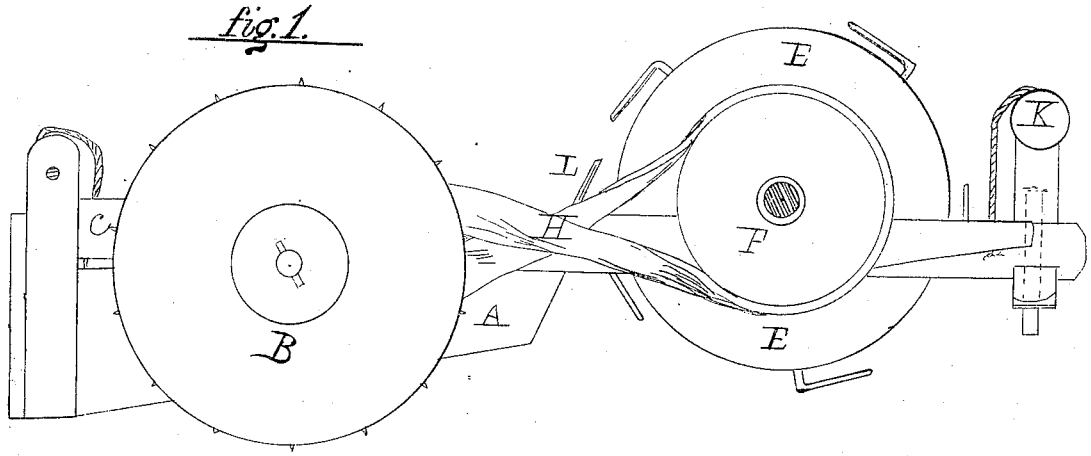
Figure 1 represents a side elevation of my machine.
Figure 2:
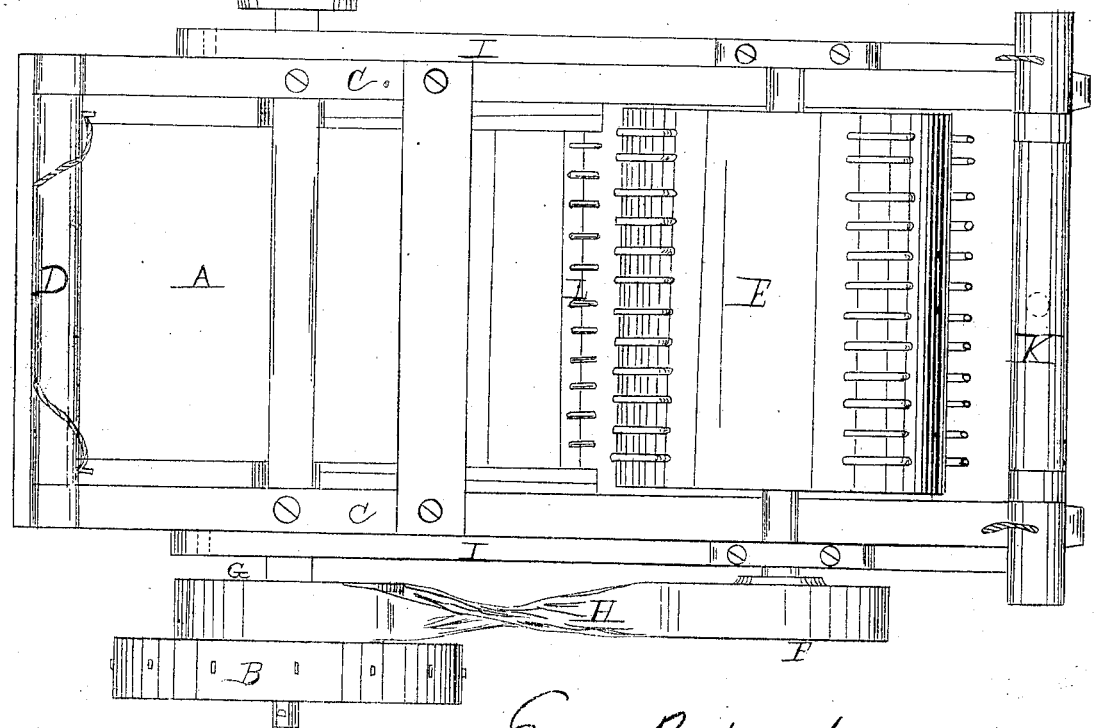
Figure 2 is a plan view of the same.

The object of my invention is to provide a machine that will not only harrow the ground, but which will also effectually clean it from stones and rubbish at the same time, thus saving time, labor, and expense.

Letter A represents the body of my machine, which rests upon axle of the driving-wheels B, the said wheels being provided with studs or projections upon their periphery, so as to enable them to catch in the ground as they move along. The axle, which supports the body A, is placed towards the rear of the body, where the load is designed to be carried, the front part being supported by the animals that are attached to it. The body A is attached to the bed-pieces C in such a manner that it can be lowered and raised by means of the windlass D. The bottom of this body A should form an inclined plane, so that the stones will run towards the back part, where they are intended to be dumped out. Letter E represents a cylinder, which is provided with a number of rows of hooks upon its periphery, for the purpose of gathering up the stones and rubbish as the machine moves over the field, at the same time that it harrows in the grain. Attached to the end of the same axle upon which the cylinder E revolves, is the pulley-wheel F, and upon the rear axle is a corresponding wheel, G. Over these two wheels the belt H passes, for the purpose of communicating motion to the cylinder E. The axle, which supports the pulley and cylinder, has its bearings upon the arm-pieces I, which are pivoted to the bed-piece C, so that the cylinder can be lowered to or raised from the ground by means of the second windlass K, which is placed upon the front end of the bed-piece C. To the front of the body A, and immediately in the rear of the cylinder E, is placed the rack L, for the purpose of catching the stones as they fall from the hooks, and conducting them into the body A.

After the seed has been sowed, the machine is driven over the ground for the purpose of harrowing it in, and at the same time to gather up the loose stones and rubbish that may be lying around. As the cylinder revolves, the hooks upon its periphery gather up the stones and carry them back, and as they begin to descend they fall upon the rack L, and are conveyed to the back part of the body A. As soon as a sufficient load has been gathered, the cylinder is raised from the ground by means of the windlass K, and the load is then driven to the place of deposit, and the body is lowered from the windlass D, when the stones fall out from the rear.

What I claim as new, and desire to secure by Letters Patent, is—

1. The cylinder E, provided with rows of hooked teeth, and arranged with the bed-pieces C, as and for the purpose set forth.

2. The combination of the cylinder E with the body A, said body being provided with a movable bottom and the rack L, as and for the purpose specified.

3. The windlass D, when arranged with the body A and cylinder E, as and for the purpose set forth.

In testimony that I claim the foregoing, I have hereunto set my hand and seal, this 9th day of July, 1867.

EZRA BABCOCK. [L. S.]

Witnesses:
C. B. STANTON,
M. J. GRADY.